(12) United States Patent
Lee et al.

(10) Patent No.: US 11,089,841 B2
(45) Date of Patent: Aug. 17, 2021

(54) HAND FIXATION BAND

(71) Applicant: Cheng Uei Precision Industry Co., Ltd., New Taipei (TW)

(72) Inventors: Tsung Shih Lee, New Taipei (TW); Chi Ming Tseng, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 16/578,573

(22) Filed: Sep. 23, 2019

(65) Prior Publication Data

US 2020/0359749 A1    Nov. 19, 2020

(30) Foreign Application Priority Data

May 15, 2019    (CN) .......................... 201920694322.9

(51) Int. Cl.
    *A44B 1/08*    (2006.01)
(52) U.S. Cl.
    CPC ..................................... *A44B 1/08* (2013.01)
(58) Field of Classification Search
    CPC ......... A44B 1/08; A45C 13/26; Y10T 16/455; Y10T 16/3831
    See application file for complete search history.

(56) References Cited

U.S. PATENT DOCUMENTS

| | | | | |
|---|---|---|---|---|
| 3,343,634 A | * | 9/1967 | Goldman | A45C 13/26 16/410 |
| 3,491,854 A | * | 1/1970 | Baxter | A44B 19/24 184/109 |
| 3,571,843 A | * | 3/1971 | Szabo | A45C 13/26 16/405 |
| 7,712,590 B1 | * | 5/2010 | Lee | A45C 13/26 190/115 |
| 9,583,078 B1 | * | 2/2017 | Nagahara | G10D 7/026 |
| 10,482,853 B1 | * | 11/2019 | Nagahara | G10D 7/026 |
| 10,537,778 B2 | * | 1/2020 | Mayer, II | A63B 67/14 |
| 10,563,680 B2 | * | 2/2020 | Benthaus | F16B 5/0657 |
| 2005/0263364 A1 | * | 12/2005 | Sher | A45C 13/26 190/115 |
| 2018/0163917 A1 | * | 6/2018 | Govindasamy | F16M 11/08 |

\* cited by examiner

*Primary Examiner* — Victor D Batson
*Assistant Examiner* — Matthew J Sullivan
(74) *Attorney, Agent, or Firm* — Lin & Associates Intellectual Property, Inc.

(57) ABSTRACT

A hand fixation band includes a fastening band, a sliding arm and a damping element. The fastening band has a main portion, and a connecting portion protruded outward from one end of the main portion. The connecting portion protrudes downward to form a first protruding rib. An inside of the first protruding rib has an accommodating space. The sliding arm is connected with the fastening band. A top surface of one end of the sliding arm has a buckling slot. The buckling slot is corresponding to and buckled with the first protruding rib. One end of the sliding arm opens a locating hole. A top surface of a peripheral wall of the locating hole surrounded by the buckling slot is defined as an accommodating surface. The damping element is disposed on the accommodating surface and is accommodated in the accommodating space.

10 Claims, 4 Drawing Sheets

HAND FIXATION BAND

CROSS-REFERENCE TO RELATED APPLICATION

The present application is based on, and claims priority from, China Patent Application No. 201920694322.9, filed May 15, 2019, the disclosure of which is hereby incorporated by reference herein in its entirety.

BACKGROUND OF THE INVENTION

1. Field of the Invention

The present invention generally relates to a hand fixation band, and more particularly to a hand fixation band having a stable pivot structure.

2. The Related Art

A conventional hand fixation band is assembled to a rocker. The conventional hand fixation band includes a fastening band, a damping element and a sliding arm. The damping element is assembled between the fastening band and the sliding arm to form a pivot structure which is pivotal and fixed in place.

However, after the pivot structure of the conventional hand fixation band pivots for many times, the damping element will be deformed to be exposed outside on account of an friction affection. Thus an appearance and a function of the pivot structure of the conventional hand fixation band are affected.

In view of the above-mentioned problems, an innovative hand fixation band is essential to be provided, the innovative hand fixation band has a stable pivot structure, and the hand fixation band keeps a normal function and a normal appearance under a long time use of the hand fixation band.

SUMMARY OF THE INVENTION

An object of the present invention is to provide a hand fixation band assembled to a rocker. The hand fixation band includes a fastening band, a sliding arm and a damping element. The fastening band has a main portion, and a connecting portion protruded outward from one end of the main portion. A free end of the connecting portion protrudes downward to form a first protruding rib. An inside of the first protruding rib has an accommodating space penetrating through a bottom surface of the first protruding rib. The sliding arm is connected with the fastening band. A top surface of one end of the sliding arm has a buckling slot recessed downward. The buckling slot is corresponding to and buckled with the first protruding rib. One end of the sliding arm facing the fastening band opens a locating hole. A top surface of a peripheral wall of the locating hole surrounded by the buckling slot is defined as an accommodating surface. The other end of the sliding arm further opens at least one external fixing hole. The at least one external fixing hole is used for connecting with the rocker. The fastening band is rotatable with respect to the sliding arm. Rotation angles of the fastening band with respect to the sliding arm are any angles in an approximately horizontal direction. The damping element is disposed on the accommodating surface and is accommodated in the accommodating space. The damping element is assembled in the accommodating space to make the damping element surrounded by the first protruding rib so as to limit the damping element on the accommodating surface and in the accommodating space.

Another object of the present invention is to provide a hand fixation band. The hand fixation band includes a fastening band, a sliding arm, a damping element and a fixing assembly. The fastening band has a main portion, and a connecting portion protruded outward from the main portion. A free end of the connecting portion protrudes downward to form a first protruding rib. An inside of the first protruding rib has an accommodating space penetrating through a bottom surface of the first protruding rib. The sliding arm is connected with the fastening band. A top surface of one end of the sliding arm has a buckling slot recessed downward. The buckling slot is corresponding to and buckled with the first protruding rib. One end of the sliding arm facing the fastening band opens a locating hole. A top surface of a peripheral wall of the locating hole surrounded by the buckling slot is defined as an accommodating surface. The other end of the sliding arm further opens at least one external fixing hole. The at least one external fixing hole is used for connecting with the rocker. The fastening band is rotatable with respect to the sliding arm. Rotation angles of the fastening band with respect to the sliding arm are any angles in an approximately horizontal direction. The damping element is disposed on the accommodating surface and is accommodated in the accommodating space. The damping element is assembled in the accommodating space to make the damping element surrounded by the first protruding rib so as to limit the damping element on the accommodating surface and in the accommodating space. The fixing assembly is fastened between the sliding arm and the fastening band.

Another object of the present invention is to provide a hand fixation band. The hand fixation band includes a fastening band, a sliding arm, a damping element and a fixing assembly. The fastening band has a main portion, and a connecting portion protruded outward from one end of the main portion. The connecting portion opens a first fastening hole. A free end of the connecting portion protrudes downward to form a first protruding rib. An inside of the first protruding rib has an accommodating space penetrating through a bottom surface of the first protruding rib. The sliding arm is connected with the fastening band. A top surface of one end of the sliding arm has a buckling slot recessed downward. The buckling slot is corresponding to and buckled with the first protruding rib. One end of the sliding arm facing the fastening band opens a locating hole. A top surface of a peripheral wall of the locating hole surrounded by the buckling slot is defined as an accommodating surface. The other end of the sliding arm further opens at least one external fixing hole. The at least one external fixing hole is used for connecting with the rocker. The damping element is disposed on the accommodating surface and is accommodated in the accommodating space. The damping element opens a second fastening hole, the first fastening hole, the locating hole and the second fastening hole are communicated with one another. The damping element is assembled in the accommodating space to make the damping element surrounded by the first protruding rib so as to limit the damping element on the accommodating surface and in the accommodating space. The fixing assembly is fastened between the sliding arm and the fastening band. The fixing assembly includes an upper fixing element and a lower fixing element. The upper fixing element has an upper base portion, and an upper fastening pillar protruded downward from a bottom surface of the upper base portion.

The lower fixing element has a lower base portion, and a lower fastening pillar protruded upward from a top surface of the lower base portion. The lower fixing element opens a fixing groove penetrating through a top surface of the lower fastening pillar and a bottom surface of the lower base portion. The lower fastening pillar passes upward through the first fastening hole, the locating hole and the second fastening hole. The upper fastening pillar is assembled in the fixing groove. The upper fixing element and the lower fixing element are fixed with each other. The fastening band is rotatable around the lower fastening pillar and the upper fastening pillar. The fastening band is rotatable with respect to the sliding arm. Rotation angles of the fastening band with respect to the sliding arm are any angles in an approximately horizontal direction.

As described above, the damping element of the hand fixation band is assembled in the accommodating space to make the damping element surrounded by the first protruding rib so as to limit the damping element on the accommodating surface and in the accommodating space. After multiple pivot rotations are generated between the fastening band and the sliding arm, the damping element will be without being deformed or shifted by a limitation of the first protruding rib, and correspondingly the hand fixation band still keeps a normal function and a normal appearance under a long time use of the hand fixation band. Furthermore, the sliding arm is connected with the fastening band by the fixing assembly to form a stable pivot structure.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
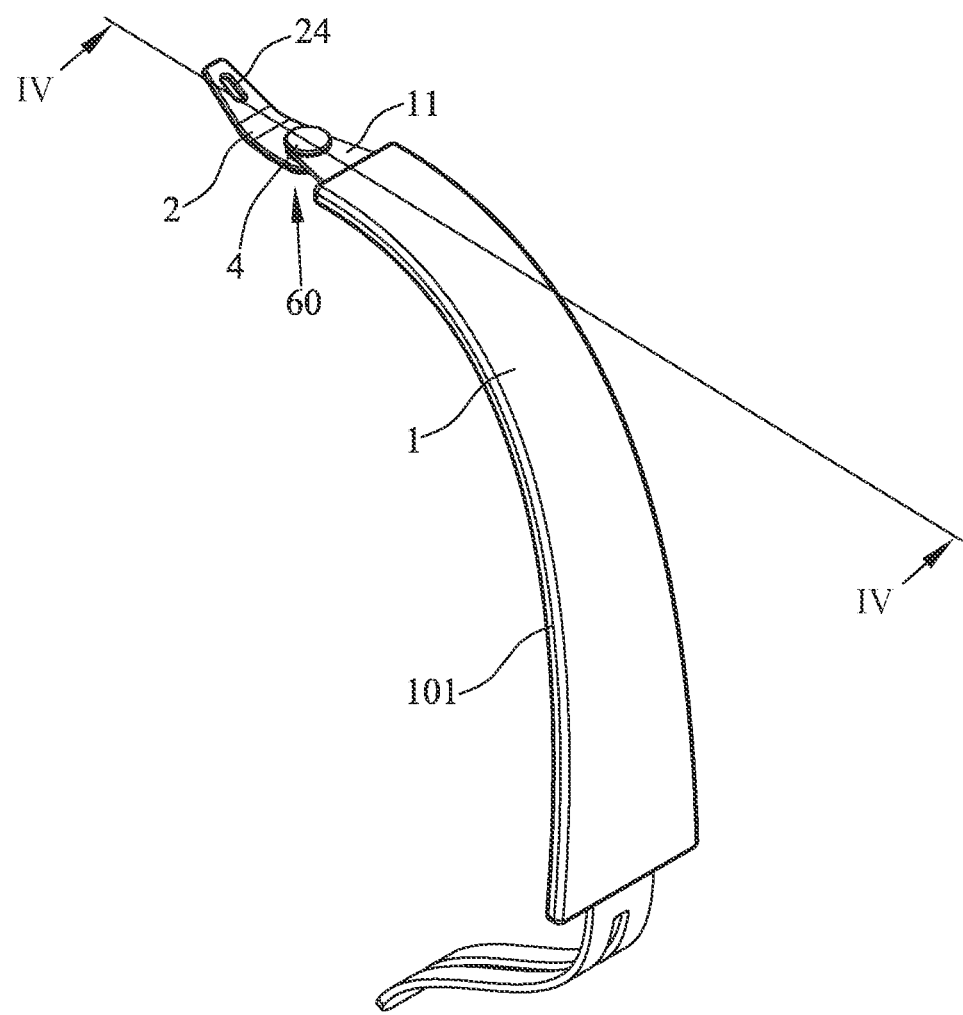
FIG. 1 is a perspective view of a hand fixation band in accordance with a preferred embodiment of the present invention.
Figure 2:
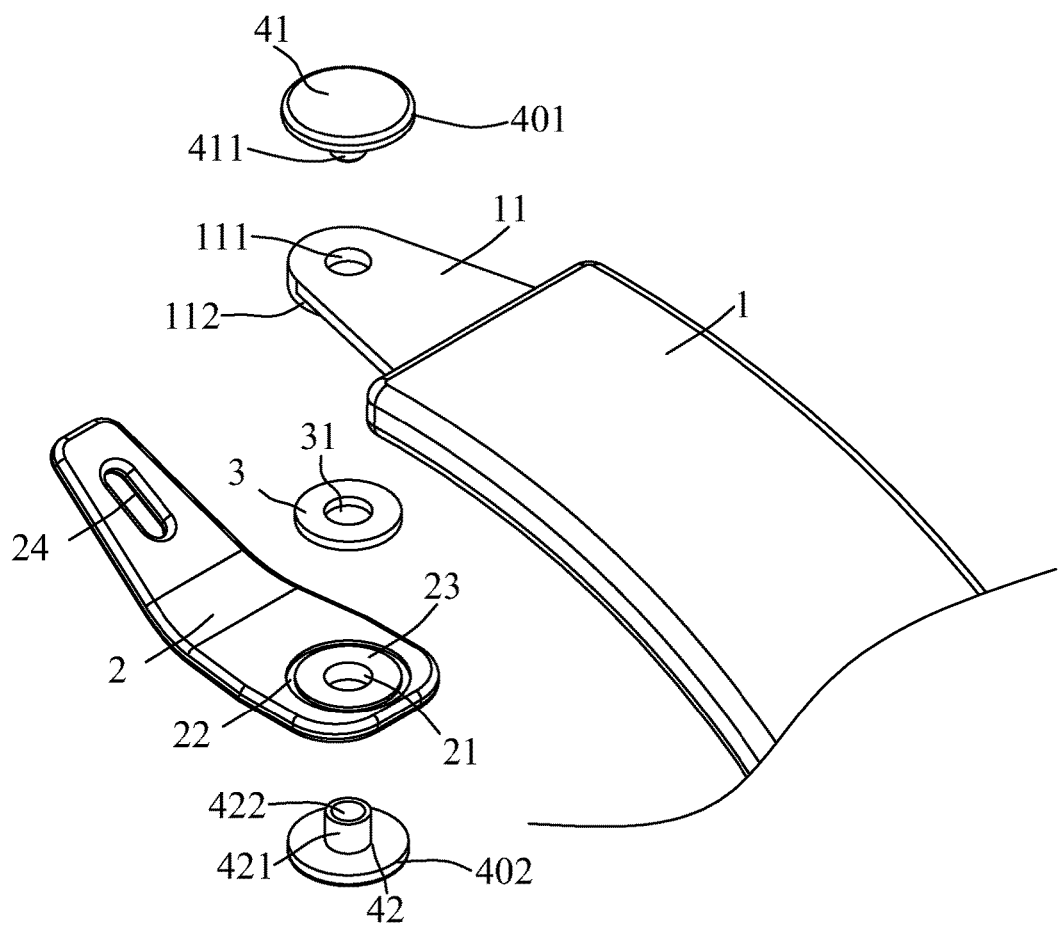
FIG. 2 is an exploded perspective view of the hand fixation band of FIG. 1.
Figure 3:
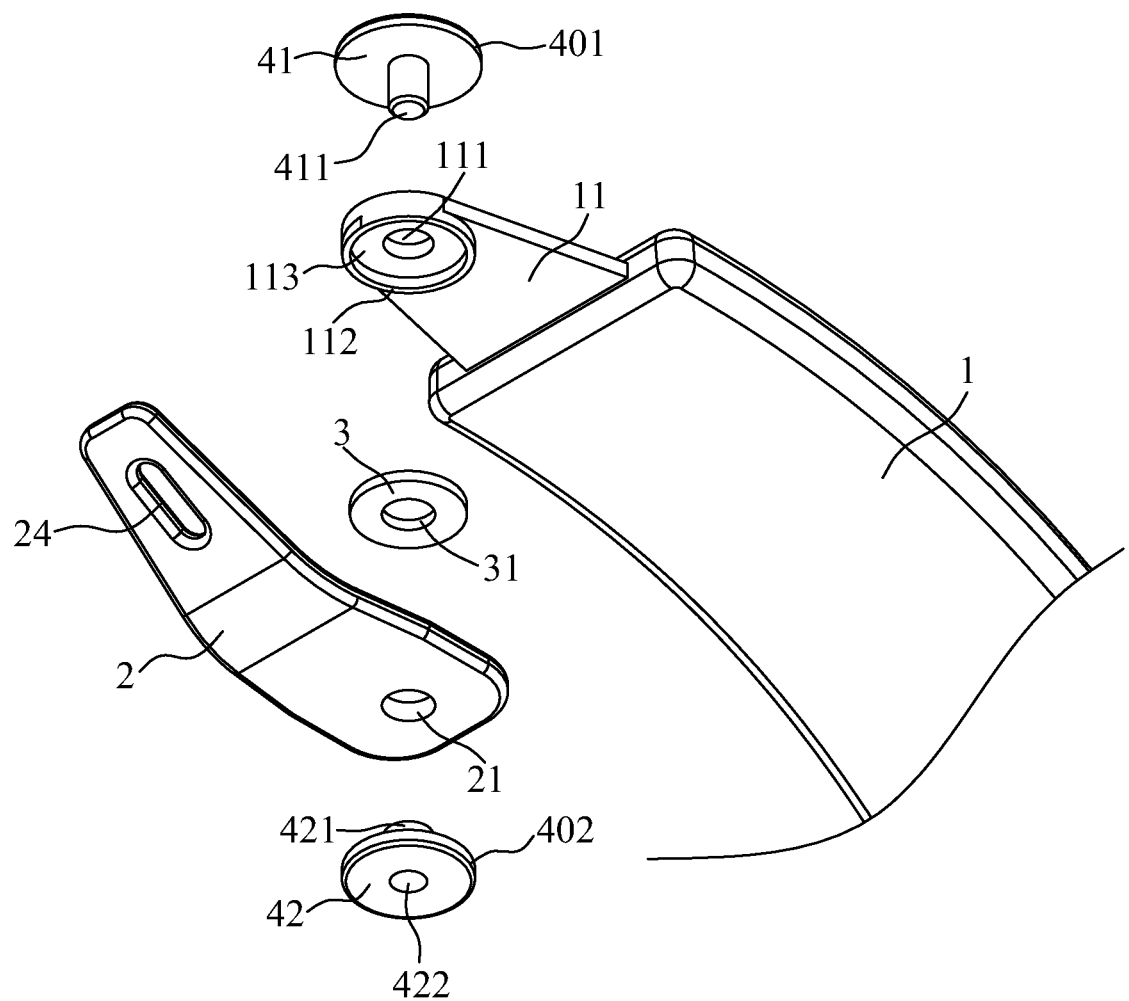
FIG. 3 is another exploded perspective view of the hand fixation band of FIG. 2.
Figure 4:
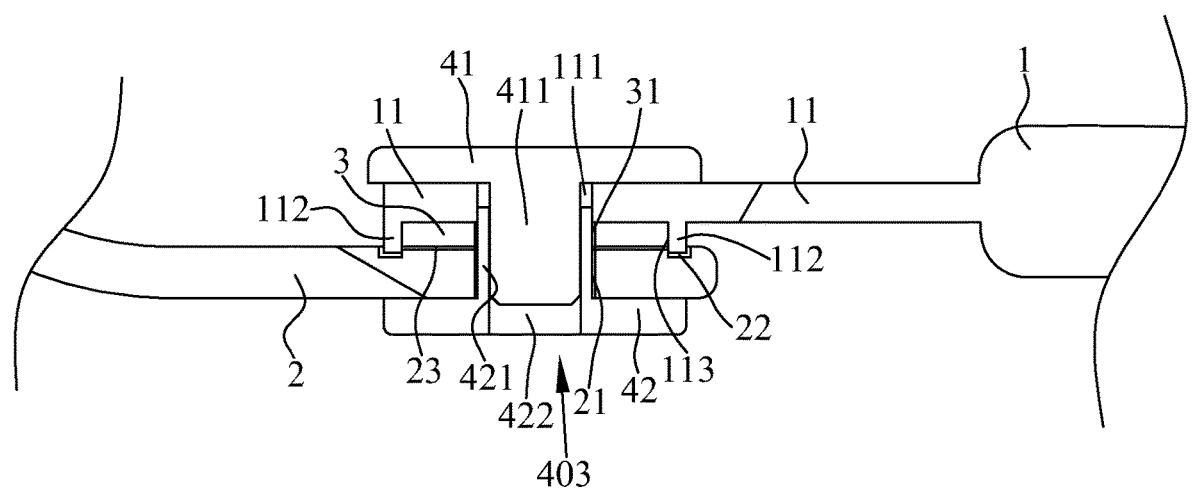
FIG. 4 is a sectional view of the hand fixation band along a line IV-IV of FIG. 1.

With reference to FIG. 1 to FIG. 3, a hand fixation band 100 in accordance with a preferred embodiment of the present invention is shown. The hand fixation band 100 is assembled to a rocker (not shown). The hand fixation band 100 includes a fastening band 1, a sliding arm 2, a damping element 3 and a fixing assembly 4. The hand fixation band 100 is flexible. The sliding arm 2, the damping element 3 together with the fixing assembly 4, and the fastening band 1 are sequentially arranged along an up-down direction.

The fastening band 1 has a main portion 101 of an arc shape, and a connecting portion 11 protruded outward from a middle of one end of the main portion 101. A middle of a free end of the connecting portion 11 opens a first fastening hole 111. The middle of the free end of the connecting portion 11 protrudes downward to form a first protruding rib 112. The first protruding rib 112 is of a ring shape. The first protruding rib 112 is located under a bottom surface of a peripheral wall of the first fastening hole 111. The first protruding rib 112 surrounds an inner portion of the bottom surface of the peripheral wall of the first fastening hole 111.

An inside of the first protruding rib 112 has an accommodating space 113 penetrating through a bottom surface of the first protruding rib 112. Specifically, the first protruding rib 112 is a ring-shaped wall.

The sliding arm 2 is connected with the fastening band 1. One end of the sliding arm 2 facing the fastening band 1 opens a locating hole 21. The locating hole 21 is corresponding to the first fastening hole 111. A top surface of the one end of the sliding arm 2 has a buckling slot 22 recessed downward. The buckling slot 22 is corresponding to and buckled with the first protruding rib 112. The buckling slot 22 surrounds the locating hole 21 and a top of a peripheral wall of the locating hole 21. Specifically, the buckling slot 22 is of the ring shape. A top surface of the peripheral wall of the locating hole 21 surrounded by the buckling slot 22 is defined as an accommodating surface 23. The other end of the sliding arm 2 further opens at least one external fixing hole 24. The at least one external fixing hole 24 is used for connecting with the rocker.

The damping element 3 is connected between the sliding arm 2 and the fastening band 1. The damping element 3 is disposed on the accommodating surface 23 and is accommodated in the accommodating space 113. Specifically, a material of the damping element 3 is rubber. A middle of the damping element 3 opens a second fastening hole 31. The second fastening hole 31 is disposed corresponding to the first fastening hole 111.

Referring to FIG. 1 to FIG. 4, the fixing assembly 4 fastened between the sliding arm 2 and the fastening band 1, includes an upper fixing element 41, and a lower fixing element 42 fixed with and matched with the upper fixing element 41. The upper fixing element 41 has a circular upper base portion 401, and an upper fastening pillar 411 protruded downward from a middle of a bottom surface of the upper base portion 401. The lower fixing element 42 has a circular lower base portion 402, and a lower fastening pillar 421 protruded upward from a middle of a top surface of the lower base portion 402. A middle of the lower fixing element 42 opens a fixing groove 422 extending vertically, and penetrating through a top surface of the lower fastening pillar 421 and a bottom surface of the lower base portion 402. The fixing groove 422 is disposed corresponding to the upper fastening pillar 411.

Specifically, the fixing assembly 4 is a rivet assembly. When the hand fixation band 100 is assembled, the first protruding rib 112 is assembled in the buckling slot 22 of the sliding arm 2. At the moment, the damping element 3 is accommodated in the accommodating space 113. The first fastening hole 111, the locating hole 21 and the second fastening hole 31 are communicated with one another. The lower fastening pillar 421 of the lower fixing element 42 passes upward through the first fastening hole 111, the locating hole 21 and the second fastening hole 31. The upper fastening pillar 411 of the fixing assembly 4 is assembled in the fixing groove 422, so that the upper fixing element 41 and the lower fixing element 42 are fixed with each other, and correspondingly the fastening band 1, the damping element 3 and the sliding arm 2 are combined by the fixing assembly 4.

When the hand fixation band 100 of the rocker is held by a user, the fastening band 1 surrounds a hand of the user to make the hand of the user hold the rocker stably. The sliding arm 2 is connected with the fastening band 1 and the rocker. The sliding arm 2 is connected with the fastening band 1 by the fixing assembly 4 to form a stable pivot structure 60 so as to make the fastening band 1 movable with respect to the sliding arm 2, and to make the fastening band 1 rotatable around the lower fastening pillar 421 and the upper fastening pillar 411. As can be seen from FIGS. 1-4, the fastening band 1 is rotatable with respect to the sliding arm 2, rotation angles of the fastening band 1 with respect to the sliding arm 2 are any angles in an approximately horizontal direction. One of the rotation angles of the fastening band 1 with respect to the sliding arm 2 is 360 degrees in the approximately horizontal direction. The fixing assembly 4 is fastened between the sliding arm 2 and the fastening band 1. The hand fixation band 100 is appropriate for each of hand shapes of different users by virtue of adjusting a position of the fastening band 1 of the hand fixation band 100. So when the user adjusts the position of the fastening band 1 of the hand fixation band 100, the fastening band 1 and the sliding arm 2 will generate a pivot rotation by means of a pivoting portion 403 of the fixing assembly 4 pivotally connected between the fastening band 1 and the sliding arm 2. The pivoting portion 403 of the fixing assembly 4 includes the lower fastening pillar 421 and the upper fastening pillar 411. In the preferred embodiment, the fastening band 1 and the sliding arm 2 will generate the pivot rotation by means of the upper fastening pillar 411 and the lower fastening pillar 421 of the fixing assembly 4. At the moment, the damping element 3 disposed between the connecting portion 11 of the fastening band 1 and the sliding arm 2 is capable of providing a static friction force and a kinetic friction force.

The static friction force is capable of making the fastening band 1 and the sliding arm 2 complete a location after generating the pivot rotation between the fastening band 1 and the sliding arm 2. When the user adjusts the position of the fastening band 1, the kinetic friction force will be without affecting the pivot rotation between the fastening band 1 and the sliding arm 2. The damping element 3 is assembled in the accommodating space 113 to make the damping element 3 surrounded by the first protruding rib 112 so as to limit the damping element 3 on the accommodating surface 23 and in the accommodating space 113. After multiple pivot rotations are generated between the fastening band 1 and the sliding arm 2, the damping element 3 will be without being deformed or shifted by a limitation of the first protruding rib 112, and correspondingly the hand fixation band 100 still keeps a normal function and a normal appearance under a long time use of the hand fixation band 100.

As described above, the damping element 3 of the hand fixation band 100 is assembled in the accommodating space 113 to make the damping element 3 surrounded by the first protruding rib 112 so as to limit the damping element 3 on the accommodating surface 23 and in the accommodating space 113. After the multiple pivot rotations are generated between the fastening band 1 and the sliding arm 2, the damping element 3 will be without being deformed or shifted by the limitation of the first protruding rib 112, and correspondingly the hand fixation band 100 still keeps the normal function and the normal appearance under the long time use of the hand fixation band 100. Furthermore, the sliding arm 2 is connected with the fastening band 1 by the fixing assembly 4 to form the stable pivot structure 60.

What is claimed is:

1. A hand fixation band assembled to a rocker, comprising:
    a fastening band having a main portion, and a connecting portion protruded outward from one end of the main portion, a free end of the connecting portion protruding downward to form a first protruding rib, an inside of the first protruding rib having an accommodating space penetrating through a bottom surface of the first protruding rib;
    a sliding arm connected with the fastening band, a top surface of one end of the sliding arm having a buckling slot recessed downward, the buckling slot being corresponding to and buckled with the first protruding rib, one end of the sliding arm facing the fastening band opening a locating hole, a top surface of a peripheral wall of the locating hole surrounded by the buckling slot being defined as an accommodating surface, the other end of the sliding arm further opening at least one external fixing hole, the at least one external fixing hole being used for connecting with the rocker, the fastening band being rotatable with respect to the sliding arm, rotation angles of the fastening band with respect to the sliding arm being any angles in an approximately horizontal direction; and
    a damping element disposed on the accommodating surface and being accommodated in the accommodating space, the damping element being assembled in the accommodating space to make the damping element surrounded by the first protruding rib so as to limit the damping element on the accommodating surface and in the accommodating space.

2. The hand fixation band as claimed in claim 1, wherein the first protruding rib is of a ring shape, the buckling slot is of the ring shape.

3. The hand fixation band as claimed in claim 1, wherein the connecting portion opens a first fastening hole, the first protruding rib surrounds an inner portion of a bottom surface of a peripheral wall of the first fastening hole, one end of the sliding arm facing the fastening band opens the locating hole, the buckling slot surrounds the locating hole and a top of the peripheral wall of the locating hole, the damping element opens a second fastening hole, the first fastening hole, the locating hole and the second fastening hole are communicated with one another.

4. The hand fixation band as claimed in claim 3, further comprising a fixing assembly fastened between the sliding arm and the fastening band, the fixing assembly including an upper fixing element and a lower fixing element, the upper fixing element having an upper base portion, and an upper fastening pillar protruded downward from a bottom surface of the upper base portion, the lower fixing element having a lower base portion, and a lower fastening pillar protruded upward from a top surface of the lower base portion, the lower fixing element opening a fixing groove extending vertically, and penetrating through a top surface of the lower fastening pillar and a bottom surface of the lower base portion, the fixing groove being disposed corresponding to the upper fastening pillar, the lower fastening pillar of the lower fixing element passing upward through the first fastening hole, the locating hole and the second fastening hole, the upper fastening pillar being assembled in the fixing groove, the upper fixing element and the lower fixing element being fixed with each other, and correspondingly the fastening band, the damping element and the sliding arm being combined by the fixing assembly.

5. A hand fixation band assembled to a rocker, comprising:
    a fastening band having a main portion, and a connecting portion protruded outward from the main portion, a free end of the connecting portion protruding downward to form a first protruding rib, an inside of the first protruding rib having an accommodating space penetrating through a bottom surface of the first protruding rib;
    a sliding arm connected with the fastening band, a top surface of one end of the sliding arm having a buckling slot recessed downward, the buckling slot being corresponding to and buckled with the first protruding rib, one end of the sliding arm facing the fastening band opening a locating hole, a top surface of a peripheral wall of the locating hole surrounded by the buckling slot being defined as an accommodating surface, the other end of the sliding arm further opening at least one external fixing hole, the at least one external fixing hole being used for connecting with the rocker, the fastening band being rotatable with respect to the sliding arm, rotation angles of the fastening band with respect to the sliding arm being any angles in an approximately horizontal direction;

a damping element disposed on the accommodating surface and being accommodated in the accommodating space, the damping element being assembled in the accommodating space to make the damping element surrounded by the first protruding rib so as to limit the damping element on the accommodating surface and in the accommodating space; and a fixing assembly fastened between the sliding arm and the fastening band.

6. The hand fixation band as claimed in claim 5, wherein the first protruding rib is of a ring shape, the buckling slot is of the ring shape.

7. The hand fixation band as claimed in claim 5, wherein the connecting portion opens a first fastening hole, the first protruding rib surrounds an inner portion of a bottom surface of a peripheral wall of the first fastening hole, one end of the sliding arm facing the fastening band opens the locating hole, the buckling slot surrounds the locating hole and a top of the peripheral wall of the locating hole, the damping element opens a second fastening hole, the first fastening hole, the locating hole and the second fastening hole are communicated with one another.

8. The hand fixation band as claimed in claim 7, wherein the fixing assembly includes an upper fixing element and a lower fixing element, the upper fixing element has an upper base portion, and an upper fastening pillar protruded downward from a bottom surface of the upper base portion, the lower fixing element has a lower base portion, and a lower fastening pillar protruded upward from a top surface of the lower base portion, the lower fixing element opens a fixing groove extending vertically, and penetrating through a top surface of the lower fastening pillar and a bottom surface of the lower base portion, the fixing groove is disposed correspondingly to the upper fastening pillar, the lower fastening pillar of the lower fixing element passes upward through the first fastening hole, the locating hole and the second fastening hole, the upper fastening pillar is assembled in the fixing groove, the upper fixing element and the lower fixing element are fixed with each other, and correspondingly the fastening band, the damping element and the sliding arm are combined by the fixing assembly.

9. A hand fixation band assembled to a rocker, comprising:

a fastening band having a main portion, and a connecting portion protruded outward from one end of the main portion, the connecting portion opening a first fastening hole, a free end of the connecting portion protruding downward to form a first protruding rib, an inside of the first protruding rib having an accommodating space penetrating through a bottom surface of the first protruding rib;

a sliding arm connected with the fastening band, a top surface of one end of the sliding arm having a buckling slot recessed downward, the buckling slot being corresponding to and buckled with the first protruding rib, one end of the sliding arm facing the fastening band opening a locating hole, a top surface of a peripheral wall of the locating hole surrounded by the buckling slot being defined as an accommodating surface, the other end of the sliding arm further opening at least one external fixing hole, the at least one external fixing hole being used for connecting with the rocker;

a damping element disposed on the accommodating surface and being accommodated in the accommodating space, the damping element opening a second fastening hole, the first fastening hole, the locating hole and the second fastening hole being communicated with one another, the damping element being assembled in the accommodating space to make the damping element surrounded by the first protruding rib so as to limit the damping element on the accommodating surface and in the accommodating space; and a fixing assembly fastened between the sliding arm and the fastening band, the fixing assembly including an upper fixing element and a lower fixing element, the upper fixing element having an upper base portion, and an upper fastening pillar protruded downward from a bottom surface of the upper base portion, the lower fixing element having a lower base portion, and a lower fastening pillar protruded upward from a top surface of the lower base portion, the lower fixing element opening a fixing groove penetrating through a top surface of the lower fastening pillar and a bottom surface of the lower base portion, the lower fastening pillar passing upward through the first fastening hole, the locating hole and the second fastening hole, the upper fastening pillar being assembled in the fixing groove, the upper fixing element and the lower fixing element being fixed with each other, wherein the fastening band is rotatable around rotate pivoting the lower fastening pillar and the upper fastening pillar, the fastening band is rotatable with respect to the sliding arm, rotation angles of the fastening band with respect to the sliding arm are any angles in an approximately horizontal direction.

10. The hand fixation band as claimed in claim 9, wherein one of the rotation angles of the fastening band with respect to the sliding arm is 360 degrees in the approximately horizontal direction.

* * * * *